(12) United States Patent
Sharma et al.

(10) Patent No.: US 12,488,014 B1
(45) Date of Patent: Dec. 2, 2025

(54) SYSTEM AND METHOD FOR STREAMLINING AND ACCELERATING CLOUD MIGRATION PROCESSES

(71) Applicant: Fractal Analytics Private Limited, Mumbai (IN)

(72) Inventors: Deepak Sharma, Bangalore (IN); Debasis Panda, Bhubaneswar (IN); Shashidhar Bommavara Ramakrishnaiah, Bangalore (IN); Shashwati Deshmukh, Pune (IN); Dasari Sai Rohith, Hanumakonda (IN); Ravi Shivam Murty, Jabalpur (IN); Vaishnavi Rai, Bangalore (IN)

(73) Assignee: Fractal Analytics Private Limited, Mumbai (IN)

( * ) Notice: Subject to any disclaimer, the term of this patent is extended or adjusted under 35 U.S.C. 154(b) by 0 days.

(21) Appl. No.: 18/932,810

(22) Filed: Oct. 31, 2024

(30) Foreign Application Priority Data

Jul. 31, 2024 (IN) .............................. 202421057927

(51) Int. Cl.
*G06F 16/25* (2019.01)
*G06F 16/21* (2019.01)
*G06F 16/23* (2019.01)

(52) U.S. Cl.
CPC .......... *G06F 16/254* (2019.01); *G06F 16/214* (2019.01); *G06F 16/2365* (2019.01)

(58) Field of Classification Search
CPC ... G06F 16/254; G06F 16/214; G06F 16/2365
See application file for complete search history.

*Primary Examiner* — Pei Yong Weng
(74) *Attorney, Agent, or Firm* — Wiley Rein LLP

(57) ABSTRACT

A system and method for streamlining and accelerating cloud migration processes may include a plurality of modules including an adaptive prompt module configured to create a library of prompts, maintain the library of prompts, and select one or more prompts from at least one large language model (LLM) based on a prompt strategy that may consider which prompts in the library are most likely to elicit accurate and relevant responses from the at least one LLM. Another module may perform inventory analysis to enhance the prompt strategy. A third module may perform workload transformations based on the library of prompts, and a fourth module may provide validation mechanisms. The adaptive prompt module also may include a self-learning module configured to enable integration across the plurality of modules.

19 Claims, 4 Drawing Sheets

SYSTEM AND METHOD FOR STREAMLINING AND ACCELERATING CLOUD MIGRATION PROCESSES

FIELD OF THE DISCLOSURE

The present disclosure generally relates to cloud computing, and more particularly to generative artificial intelligence (AI)-enhanced cloud migration.

BACKGROUND

Cloud migrations can be challenging and overwhelming and need careful planning and execution to ensure a smooth transition. Starting from understanding the existing landscape, capturing inventory, performing detailed analysis, to coming up with a strategy and execution plan followed by performing migration, assurance, and operationalization, it involves hundreds of moving parts that need to be orchestrated.

Migrating data poses several challenges, including the need to handle diverse components such as data stores (e.g., Teradata, Oracle), extract transform and load (ETL) processes (e.g., Informatica, Datastage, and Ab Initio), and data consumption tools (e.g., Tableau, MicroStrategy, Power BI), as well as the complexity of understanding legacy platforms like SAS and Mainframes developed over several decades, where documentation may be lacking and various code versions exist, discrepancies in data structures and handling across different databases, programming languages, and reporting tools, and the potential for version incompatibilities due to upgrades in ETL and database systems.

Additionally, accurately mapping dependencies between existing on-premises infrastructure and cloud resources is a daunting task. Failing to identify and address these dependencies can result in inefficient resource allocation, application performance bottlenecks, and potential data integrity issues.

SUMMARY

Embodiments of the present disclosure may provide more efficient means of automatically converting and adapting code to a target cloud platform. Furthermore, embodiments of the present disclosure may provide accurate and automated dependency mapping that can analyze code and configurations comprehensively, ensuring that resources are properly migrated. Embodiments of the present disclosure also may provide a system that can not only streamline the migration process but also minimize downtime, reduce errors, and enhance data consistency during cloud migration, ultimately leading to a more efficient and reliable cloud adoption process. Embodiments of the present disclosure may ensure compatibility and data consistency across various components, databases, programming languages, and reporting tools during the migration process. This may involve addressing issues such as data structure disparities, inconsistent date handling, and the impact of version upgrades on deprecated features and data types. These technical challenges can significantly complicate the migration process and require careful planning and expertise to overcome.

Embodiments of the present disclosure may provide a system for streamlining and accelerating cloud migration comprising: an adaptive prompt module configured to create a library of prompts, maintain the library of prompts, and select one or more prompts from at least one large language model (LLM) based on a prompt strategy that may consider which prompts in the library are most likely to elicit accurate and relevant responses from the at least one LLM; a Rovr module comprising an inventory analysis module configured to initiate the cloud migration by conducting inventory analysis of existing on-premises infrastructure and applications using generative artificial intelligence (AI) to create a detailed inventory report that serves as a blueprint for a cloud migration plan, wherein the Rovr module is configured to provide generated insights to the adaptive prompt module to enhance the prompt strategy; a Movr module configured to perform workload transformations and determine the prompt for each specific workload transformation, the Movr module including a workload transformation engine that performs the workload transformations based on the library of prompts; and an Audtr module configured to provide validation mechanisms to ensure accuracy and integrity of original and converted assets guided by LLM procedures, wherein the prompt selection of the adaptive prompt module may influence the validation mechanisms used by the Audtr module. The prompt strategy may be based on context and/or historical learning. The adaptive prompt module may create a library of prompts by leveraging real-time information. The real-time information may be selected from the group comprising: existing on-premises infrastructure, a specified cloud service or provider in use, scale of the cloud migration, and/or other unique constraints or requirements. Historical learning may comprise consideration of historical performance data selected from the group comprising: success of previous migration prompts, preferred migration strategies for similar systems, and/or lessons learned from past migrations. The prompts in the library may be generated based on the prompt strategy, context of a current task, and/or insights gained from historical data. The selection of one or more prompts may be iterative and adaptive. The adaptive prompt module may continually assess quality of responses from the selection of one or more prompts from the at least one LLM and dynamically adjust the prompt selection strategy. The Rovr module may be configured to generate asset explainability, capture dependencies, and identify lineage to provide a comprehensive analysis report evaluating feasibility of automated conversion. Inventory analysis may involve cataloging hardware, software, configurations, and dependencies. The Rovr module may be further configured to offer recommendations for rationalization, conduct duplicate/similarity analysis, and suggest plans for execution in waves. The workload transformations may be selected from the group comprising: code/extract transform load (ETL), reports, and/or data. The Movr module may leverage real-time contextual information and past performance data to determine the prompt for each specific workload transformation. The validation mechanisms may be selected from the group comprising: visual comparison, test script generation and execution, conversion statistics and comparison, migration reports, and similarity comparison reports. The Audtr module also may comprise a validation module configured to ensure correctness and functionality of migrated applications and data by providing corrective suggestions or making adjustments; a recommendations module configured to monitor and optimize resource allocation, performance, and cost-efficiency; and a migration reports module configured to generate documentation summarizing the migration process. The migration reports module may be configured to perform duplicate analysis using generative AI. The adaptive prompt module also may include a self-learning module configured to enable integration across the Audtr module, the Movr module, and the Rovr module.

Other embodiments of the present disclosure may provide a system for streamlining and accelerating cloud migration comprising: an adaptive prompt module configured to define a prompt strategy, create a library of effective prompts, and dynamically select most suitable prompts from at least one large language model (LLM) based on context and historical learning; a Rovr module including a suite of services for inventory collection and subsequent assessment, the Rovr module comprising an inventory analysis module configured to initiate the cloud migration by conducting inventory analysis of existing on-premises infrastructure and applications using generative artificial intelligence (AI), wherein the Rovr module may be configured to provide generated insights to the adaptive prompt module to enhance the prompt strategy; a Movr module configured to perform workload transformations and determine the prompt for each specific workload transformation, the Movr module including a workload transformation engine that may perform the workload transformations based on the library of prompts; and an Audtr module configured to provide validation mechanisms to ensure accuracy and integrity of original and converted assets guided by LLM procedures, wherein the prompt selection of the adaptive prompt module may influence the validation mechanisms used by the Audtr module, and wherein the adaptive prompt module includes a self-learning module configured to enable integration across the Audtr module, the Movr module, and the Rovr module. The Audtr module also may include a validation module configured to ensure correctness and functionality of migrated applications and data by providing corrective suggestions or making adjustments; a recommendations module configured to monitor and optimize resource allocation, performance, and cost-efficiency; and a migration reports module configured to generate documentation summarizing the migration process. The Movr module may leverage real-time contextual information and past performance data to determine the prompt for each specific workload transformation.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure may provide a system and method for streamlining and accelerating cloud migration processes. The system and method may include a plurality of modules including an adaptive prompt module configured to create a library of prompts, maintain the library of prompts, and select one or more prompts from at least one large language model (LLM) based on a prompt strategy that may consider which prompts in the library are most likely to elicit accurate and relevant responses from the at least one LLM; a Rovr module comprising an inventory analysis module configured to initiate the cloud migration by conducting inventory analysis of existing on-premises infrastructure and applications using generative artificial intelligence (AI) to create a detailed inventory report that serves as a blueprint for a cloud migration plan, wherein the Rovr module is configured to provide generated insights to the adaptive prompt module to enhance the prompt strategy; a Movr module configured to perform workload transformations and determine the prompt for each specific workload transformation, the Movr module including a workload transformation engine that performs the workload transformations based on the library of prompts; and an Audtr module configured to provide validation mechanisms to ensure accuracy and integrity of original and converted assets guided by LLM procedures, wherein the prompt selection of the adaptive prompt module may influence the validation mechanisms used by the Audtr module. The Audtr module also may comprise a validation module configured to ensure correctness and functionality of migrated applications and data by providing corrective suggestions or making adjustments; a recommendations module configured to monitor and optimize resource allocation, performance, and cost-efficiency; and a migration reports module configured to generate documentation summarizing the migration process. The adaptive prompt module also may include a self-learning module configured to enable integration across the Audtr module, the Movr module, and the Rovr module.

Figure 1:
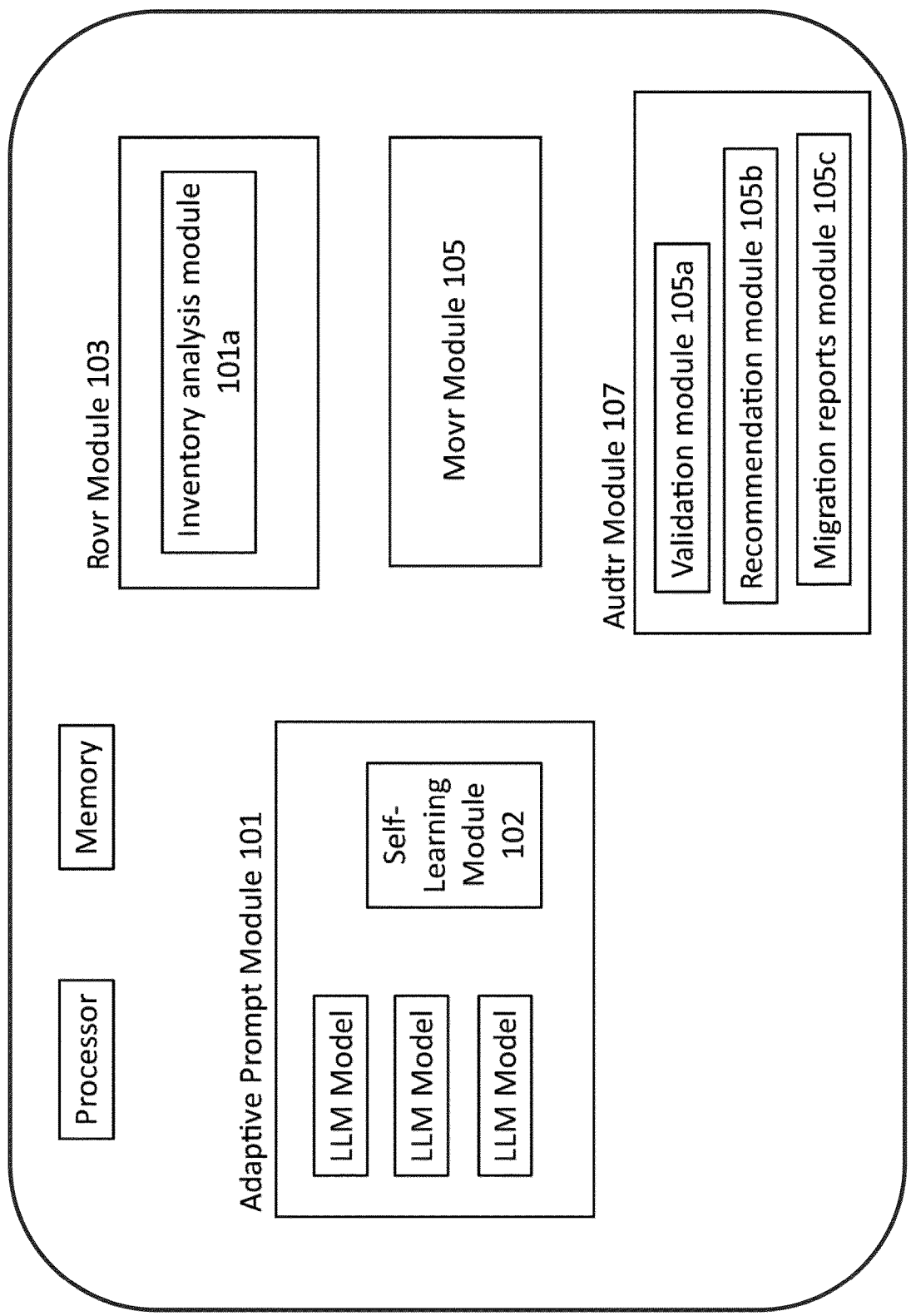
FIG. 1 depicts a system for streamlining and accelerating cloud migration processes according to an embodiment of the present disclosure.

FIG. 1 depicts a system for streamlining and accelerating cloud migration processes according to an embodiment of the present disclosure. More specifically, FIG. 1 provides a functional block diagram of adaptive prompt module 101, Rovr module 103, Movr module, and Audtr module 107. Each of these modules are described in more detail as follows.

Adaptive prompt module 101 may be configured to select one or more prompts from one or many large language models (LLMs) based on prompt strategy. The prompt strategy employed may be based on context and/or historical learning. Adaptive prompt module 101 may be configured to create a library of prompts. More specifically, adaptive prompt module 101 may be configured to leverage real-time information including, but not limited to, existing on-premises infrastructure, the specific cloud service or provider in use, the scale of the migration, and any unique constraints or requirements. Adaptive prompt module 101 also may consider historical performance data including, but not limited to, the success of previous migration prompts, preferred migration strategies for similar systems, and any lessons learned from past migrations. For example, if the historical performance data indicates that certain migration prompts or strategies have been particularly efficient in moving databases to a specific cloud platform, adaptive prompt module 101 may prioritize those prompts. Similarly, if the current context suggests the need for specialized handling of legacy applications or large datasets, the prompt strategy may adapt accordingly to address these challenges. This may ensure that the selected prompt aligns with the specific needs and goals of the cloud migration project, making the process smoother and more efficient.

Adaptive prompt module 101 may be designed to work in conjunction with a plurality of large language models (LLMs). LLMs are very large deep learning models that may be pre-trained on vast amounts of data, enabling them to understand and generate human-like text for a wide range of tasks. These models are powerful language processing algorithms that can generate text and responses based on given prompts. The underlying transformer may be a set of neural networks that may include an encoder and a decoder with self-attention capabilities. The encoder and decoder may extract meanings from a sequence of text and understand the relationships between words and phrases in it.

Further, adaptive prompt module 101 may maintain a library of prompts. These prompts are pre-defined text inputs that are known to be effective in communicating with LLMs. The prompts in the library may be created based on the prompt strategy, the context of the current task, and/or insights gained from historical data. Adaptive prompt module 101 may dynamically evaluate the context and requirements of the current cloud migration task. It may do so by analyzing the specific needs, constraints, and goals of the migration. Adaptive prompt module 101 may take the prompt strategy into account, considering which prompts in the library are most likely to elicit accurate and relevant responses from the LLMs. The process of selecting prompts may be iterative and adaptive in embodiments of the present disclosure.

As adaptive prompt module 101 interacts with LLMs and receives responses, it may continuously assess the quality of those responses. If the responses are not meeting the desired criteria, adaptive prompt module 101 can dynamically adjust the prompt selection strategy, experimenting with different prompts until the desired outcome is achieved. Adaptive prompt module 101 may be configured by defining a prompt strategy, creating a library of effective prompts, and dynamically selecting the most suitable prompts based on the context and historical learning. This process may allow for effective communication with LLMs and may ensure that the responses generated align with the specific requirements of the cloud migration task.

Rovr module 103 may be configured to evaluate the current landscape, uncover nuances, and address unknown factors. Rovr module 103 may comprise a suite of services for inventory collection and subsequent assessment. Rovr module 103 may be configured to generate asset explainability, capture dependencies, and identify lineage, among other tasks. Rovr module 103 may be configured to provide a comprehensive analysis report, including complete details of all analyzed inventories at the asset and code levels. It may assess workload complexity, trace lineage, identify relationships, and evaluate the feasibility of automated conversion.

Rovr module 103 may include inventory analysis module 101a. Inventory analysis module 101a may be configured to initiate the migration process by conducting an extensive inventory analysis of the existing on-premises infrastructure and applications. This analysis may involve cataloging hardware, software, configurations, and dependencies. Through the power of generative artificial intelligence (AI), inventory analysis module 101a may create a detailed inventory report, which may serve as the foundational blueprint for the migration plan.

Additionally, Rovr module 103 may be configured to offer recommendations for rationalization, conduct duplicate/similarity analysis, and suggest plans for execution in waves. Rovr module 103 may configured to provide generated insights to adaptive prompt module 101. These capabilities can be used to enhance the prompt strategy by providing a deeper understanding of the assets to be migrated, their relationships, and the potential impact of the migration. This may ensure that the selected prompt aligns not only with the broader goals of the cloud migration but also with the specific characteristics of the assets and their interdependencies, making the migration process smoother and more efficient.

Movr module 105 may be configured to perform the workload transformations. Movr module 105 may include a workload transformation engine based on defined prompt libraries to perform the workload transformations e.g. Code/ETL (SAS to PySpark), Reports (Tableau to PowerBI etc), and data (Teradata to BigQuery or Redshift).

Movr module 105 may leverage real-time contextual information and past performance data to determine the most effective prompt for each specific workload transformation. For instance, if the historical data indicates that certain prompt strategies have been particularly efficient in migrating data from Teradata to BigQuery, Movr module 105 may prioritize those prompts when dealing with similar migrations.

Adaptive prompt module 101 may be configured to ensure that the selected prompt aligns with the unique needs and goals of the cloud migration project, facilitating a seamless transition and efficient workload transformations. By using this adaptive prompt strategy in conjunction with the capabilities of Movr module 105, this can streamline the cloud migration processes and address various transformation requirements, thereby enhancing the overall success of the migration project.

Audtr module 107 may be configured to offer a comprehensive suite of validation mechanisms to ensure the accuracy and integrity of both original and converted assets. This validation process may be conducted in a systematic manner, guided by advanced language model (LLM)-based procedures.

Audtr module 107 may offer a comprehensive suite of validation mechanisms, including visual comparison, test script generation and execution, conversion statistics and comparison, migration reports, and similarity comparison reports. These validation methods may be crucial for assessing the fidelity of the migrated assets. The adaptive prompt selection, which is based on real-time context and historical performance, can influence the specific validation methods chosen by Audtr module 107. For instance, if the prompt strategy indicates a need for extra scrutiny on certain aspects of the migration, Audtr module 107 may focus more on generating and executing specific test scripts or producing detailed migration reports to ensure that the migrated assets meet the desired standards.

Furthermore, in cases where the validation process uncovers discrepancies or issues, Audtr module 107 may provide explainability and documentation. It may explain the nature of the discrepancies, and the adaptive prompt may even adapt based on these findings to address any identified issues more effectively in subsequent migration tasks. This seamless interaction between adaptive prompt selection and Audtr module 107's validation mechanisms may enhance the overall efficiency and accuracy of cloud migration projects, ensuring that both original and converted assets are in compliance with the desired benchmarks and requirements.

There are various types of validations for which Audtr module 107 may provide support. Specifically, for tasks related to code schemas and ETL workload migration, Audtr module 107 may offer a plurality of validation methods: visual comparison, test scripts generation and execution, conversion statistics and comparison, migration reports and similarity comparison reports, and explainability and documentation. With respect to visual comparison, Audtr module 107 may enable side-by-side visual comparisons of original and converted assets, facilitating a quick assessment of any discrepancies. Audtr module 107 can automatically generate and execute test scripts to validate the functionality and performance of the converted assets. Audtr module 107 may generate statistics on the conversion process and compare them with predefined benchmarks to identify any deviations.

Detailed migration reports may be generated to document the migration process, and similarity comparison reports may highlight the similarities and differences between the original and converted assets. Audtr module 107 may provide explanations for any discrepancies or issues identified during the validation process, along with comprehensive documentation for future reference. In addition to these code and ETL-related validations, Audtr module 107 also may support data-related assurance by offering various data quality checks, including, but not limited to, distribution stats, range statistics, sampling, cell to cell, schema validation, count validation, and value statistics. More specifically, Audtr module 107 may analyze data distribution to ensure that it aligns with expected patterns and distributions. Audtr module 107 may check whether data values fall within predefined ranges to ensure data accuracy. Audtr module 107 may employ sampling techniques to validate a subset of data for quality assessment. A cell-to-cell validation method may ensure consistency and accuracy between corresponding data cells in the original and converted assets. Audtr module 107 may verify that the data schema remains consistent throughout the migration process. Audtr module 107 may check the count of records or data elements to confirm that there is no loss or duplication during migration. Audtr module 107 may generate statistics on data values to identify any anomalies or outliers. By offering these comprehensive validation mechanisms, Audtr module 107 may ensure that the entire migration process, including code, ETL workloads, and data, may be thoroughly scrutinized, reducing the risk of errors and ensuring a smooth and reliable transition.

Audtr module 107 may include validation module 105a, recommendation module 105b, and migration reports module 105c. Validation module 105a may be configured to ensure the correctness and functionality of migrated applications and data. Validation module 105a may be configured to automatically scan the migrated applications and databases, performing compatibility checks, data integrity tests, and functional validations. When discrepancies or issues are detected, validation module 105a may be configured to generate corrective suggestions or autonomously make the necessary adjustments, thereby accelerating the validation process. Recommendation module 105b may be configured to continually monitors and optimizes resource allocation, performance, and cost-efficiency throughout the migration journey. Recommendation module 105b may offer real-time insights and recommendations, helping organizations make data-driven decisions to maximize the benefits of cloud migration.

Migration reports module 105c may be configured to offer comprehensive visibility and analysis throughout the migration journey. Migration reports module 105c may generate comprehensive documentation summarizing the migration process, including all findings from the duplicate analysis, similarity analysis, dependency diagrams, and code migration statistics. This documentation may serve as a valuable reference for auditing, compliance, and future maintenance.

Migration reports module 105c may include several key functionalities. The duplicate analysis may identify and eliminate redundant data and code elements during migration. Using generative AI algorithms, it may scan the source environment for duplicate files, configurations, or code snippets that may exist across the infrastructure. By removing duplicates, the duplicate analysis not only may optimize storage resources but also ensures a cleaner and more efficient cloud deployment. Leveraging advanced machine learning techniques, the similarity analysis may be configured to assesses the similarity between on-premises and cloud-based resources. It may highlight areas where resources closely match and areas where divergence may occur during migration. This analysis may provide valuable guidance for making informed decisions about resource mapping and data transformation. Dependency diagrams may be configured to offer visual representations of the relationships and dependencies between various components of the application and infrastructure. Generative AI algorithms may automatically generate these diagrams, making it easier for stakeholders to understand the intricate interplay of resources. Dependency diagrams may assist in planning the migration sequence, minimizing disruptions, and ensuring that critical dependencies are maintained. The code migration statistics may provide detailed metrics and insights into the code migration process. It may track the progress of code migration, including the number of lines of code migrated, the number of code components successfully transferred, and any errors or exceptions encountered during the process. This data may be essential for tracking migration milestones, estimating completion times, and troubleshooting any migration issues promptly.

Self-learning module 102 within adaptive prompt module 101 may be configured for seamless integration across Audtr module 107, Movr module 105, and Rovr module 103 and may contribute to the continuous improvement and efficiency of the entire cloud migration process. The prompt strategy also may incorporate self-learning for continuous improvement. The prompt strategy employed by self-learning module 102 may be rooted in real-time context and historical learning, allowing it to dynamically adjust its prompt selections based on past experiences and the specific needs of each migration project. Self-learning module 102 may be configured for continuous analysis of historical data and outcomes. It may assess the effectiveness of previously chosen prompts in various migration scenarios and uses this data to optimize future selections. This adaptive self-learning mechanism not only may enhance the efficiency of prompt selection but also may align the module's prompt library with evolving best practices and strategies for successful cloud migration. Self-learning module 102 also may influence the creation and maintenance of the prompt library. Over time, module 102 may refine its library of prompts based on insights gained from past migrations. It may add new prompts that have proven effective and may retire or revise prompts that have shown suboptimal results. By doing so, adaptive prompt module 101 may ensure that the library is always up-to-date and reflects the most relevant and successful prompts for cloud migration, contributing to the continuous improvement of the migration process as a whole.

This self-learning aspect may allow Audtr module 107 to become increasingly efficient in identifying discrepancies and issues during cloud migration and adapting its validation mechanisms accordingly based on past experiences. The self-learning component may assist Movr module 105 in fine-tuning its transformation strategies over time based on the feedback and validation results provided by Audtr module 107. This way, Movr module 105 may continually optimize its code and workload transformations, ensuring that they align with best practices and the specific needs of each cloud migration project. Self-learning module 102 may allow Rovr module 103 to refine its analytical capabilities over time, enabling it to provide increasingly detailed and accurate reports on asset inventories and code levels. Self-learning module 102 also may extend to the identification of asset explainability, dependency capture, and lineage tracking within Rovr module 103. The module may become more adept at these tasks as it learns from its prior analyses and adapts its methodologies to the evolving needs of each migration project.

Figure 2A:
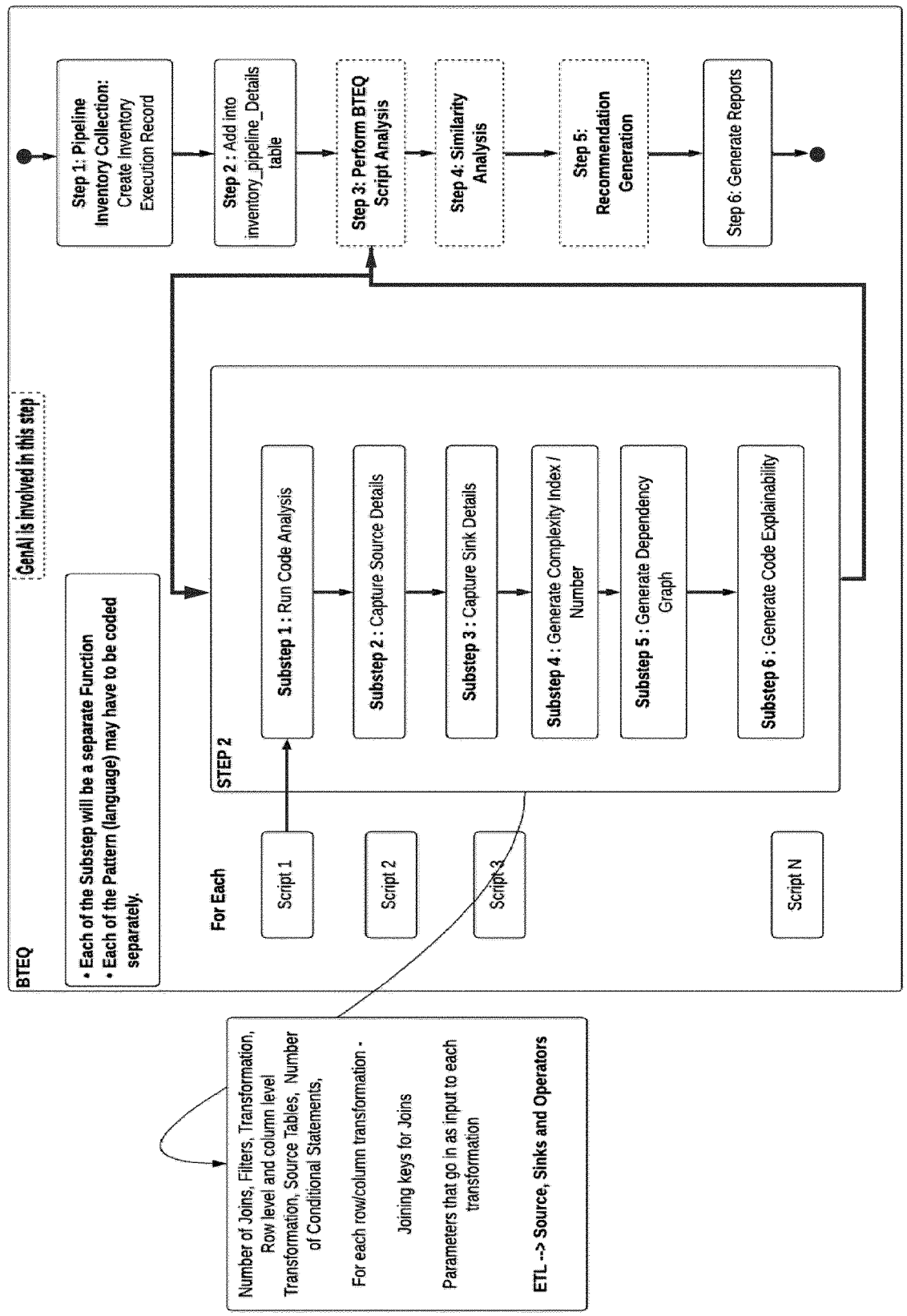
FIGS. 2A and 2B depicts steps of cloud migration analysis according to embodiments of the present disclosure.
Figure 2B:
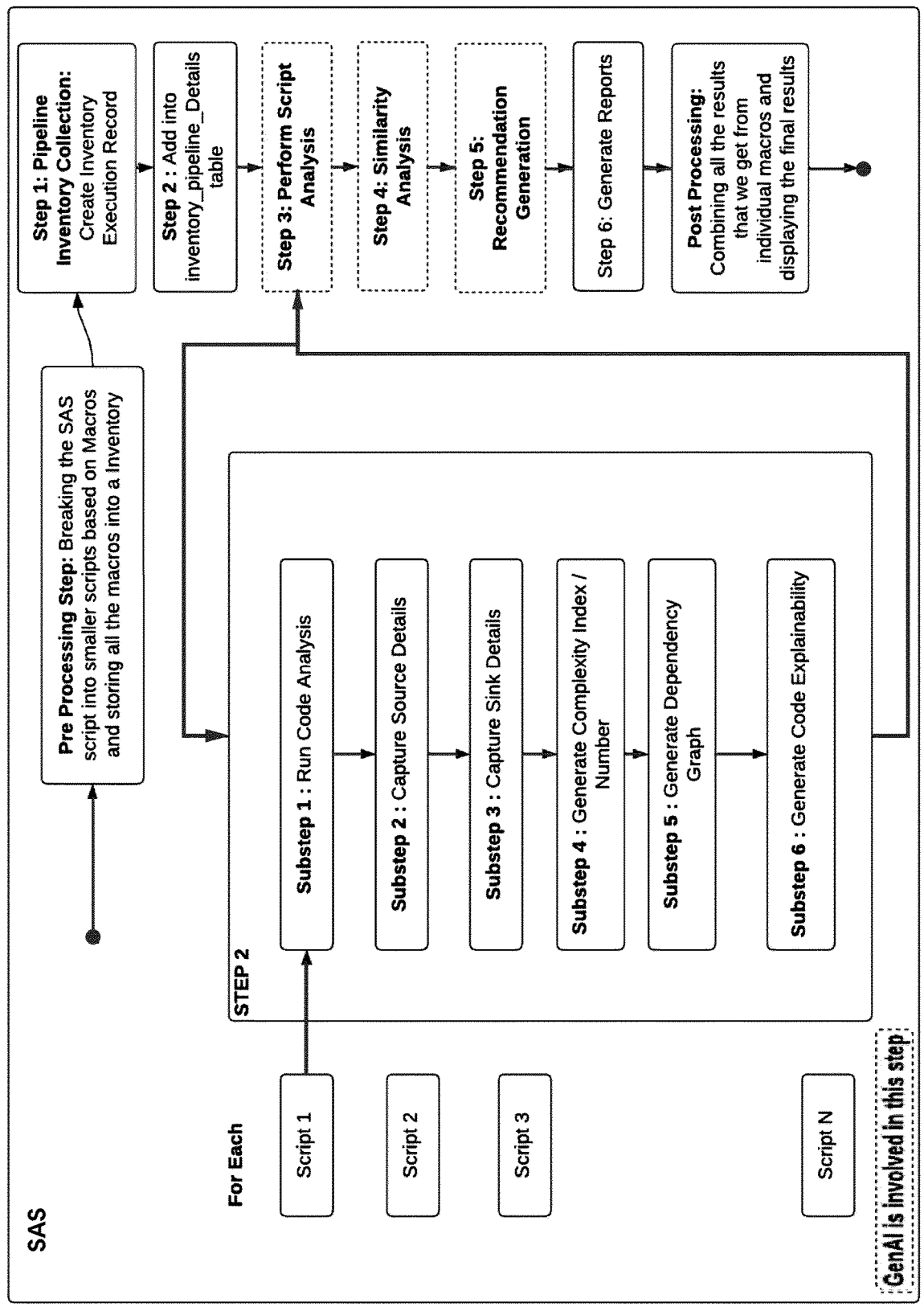

FIG. 2A depicts steps of the analysis according to an embodiment of the present disclosure. Step 1 may provide for pipeline inventory collection wherein an inventory execution record may be created. In Step 2, the invention execution record may be added into inventory_pipeline_details table. In Step 3, a BTEQ script analysis may be performed. This may include a plurality of substeps as depicted in FIG. 2A and FIG. 2B. In Step 4, similarity analysis may occur. In Step 5, recommendation generation may occur, and in Step 6, reports may be generated.

In Substep 1, code analysis may be run. The number of joins, filters, transformations, row level and column level, transformation, source tables, and number of conditional statements may be part of the code analysis. For each row/column transformation, there may be joining keys for joins and parameters that go in as input to each transformation. In Substep 2, source details may be captured. In Substep 3, sink details may be captured. In terms of ETL/ELT (Extract Transform Load/Extract Load Transform) process, sink refers to the target data store (table, file etc.) where the data finally resides. Accordingly, the flow is to read from source, process and transform, and write to sink. In Substep 4, a complexity index/number may be generated. In Substep 5, a dependency graph may be generated, and in Substep 6, code explainability may be generated. These substeps may be performed for each script. It should be appreciated that each of the substeps may be a separate function, and each of the patterns (language) may be coded separately in embodiments of the present disclosure. ETL may be transformed to source, sinks, and operators in embodiments of the present disclosure.

Further, as depicted on FIG. 2B, there is a dot that may represents a preprocessing step prior to Step 1 in embodiments of the present disclosure. In this preprocessing step, the SAS script may be broken into smaller scripts based on macros and then the micros may be stored in an inventory. In addition, there may be a post-processing step following Step 6 wherein all results obtained from the individual macros may be combined to obtain the final results.

Figure 3:
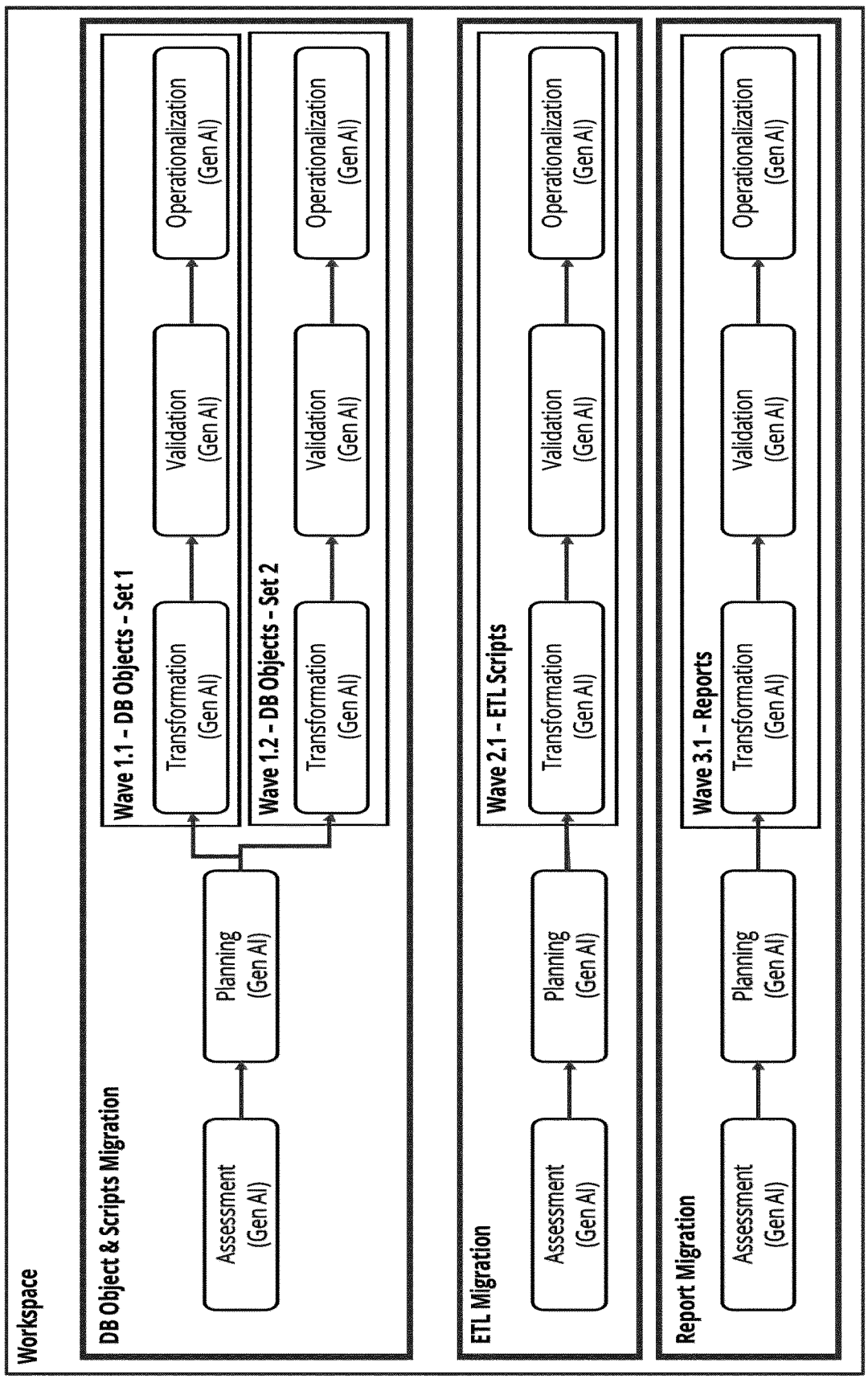
FIG. 3 depicts a workspace according to an embodiment of the present disclosure.

FIG. 3 depicts a workspace according to an embodiment of the present disclosure. The workspace may include DB object and scripts migration, ETL migration, and report migration. DB object and scripts migration may include assessment (generative AI) to planning (generative AI) leading to Wave 1.1—DB Objects—Set 1 and Wave 1.2—DB Objects—Set 2. Each of Wave 1.1 and Wave 1.2 may include transformation (generative AI) to validation (generative AI) to operationalization (generative AI). ETL migration may include assessment (generative AI) to planning (generative AI) leading to Wave 2.1—ETL Scripts. Wave 2.1—ETL Scripts may include transformation (generative AI) to validation (generative AI) to operationalization (generative AI). Report migration may include assessment (generative AI) to planning (generative AI) leading to Wave 3.1—Reports. Wave 3.1—Reports may include transformation (generative AI) to validation (generative AI) to operationalization (generative AI).

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A system for streamlining and accelerating cloud migration comprising:
    an adaptive prompt module configured to create a library of prompts, maintain the library of prompts, and dynamically select one or more prompts from at least one large language model (LLM) based on an and adaptive iterative prompt strategy based on context and historical learning and communication with the at least one LLM to align with specific requirements of a cloud migration task;
    a first module comprising an inventory analysis module configured to initiate the cloud migration by conducting inventory analysis of existing on-premises infrastructure and applications using generative artificial intelligence (AI) to create a detailed inventory report that serves as a blueprint for a cloud migration plan, wherein the first module is configured to provide generated insights to the adaptive prompt module to enhance the prompt strategy;

a second module configured to perform workload transformations and determine the prompt for each specific workload transformation, the second module including a workload transformation engine that performs the workload transformations based on the library of prompts; and a third module configured to provide validation mechanisms to ensure accuracy and integrity of original and converted assets guided by LLM procedures, wherein the prompt selection of the adaptive prompt module influences the validation mechanisms used by the third module, the third module further including a migration reports module that generates documentation summarizing the migration, performs duplicate analysis using generative AI, and uses generative AI to automatically generate dependency diagrams that offer visual representations of the relations and dependencies between the components of the system.

2. The system of claim 1, wherein the prompt strategy is based on context and/or historical learning.

3. The system of claim 1, wherein the adaptive prompt module creates a library of prompts by leveraging real-time information.

4. The system of claim 3, wherein the real-time information is selected from the group comprising:
existing on-premises infrastructure, a specified cloud service or provider in use, scale of the cloud migration, and/or other unique constraints or requirements.

5. The system of claim 2, wherein historical learning comprises consideration of historical performance data selected from the group comprising:
success of previous migration prompts, preferred migration strategies for similar systems, and/or lessons learned from past migrations.

6. The system of claim 1, wherein the prompts in the library are generated based on the prompt strategy, context of a current task, and/or insights gained from historical data.

7. The system of claim 1, wherein the selection of one or more prompts is iterative and adaptive.

8. The system of claim 1, wherein the adaptive prompt module continually assesses quality of responses from the selection of one or more prompts from the at least one LLM and dynamically adjusts the prompt selection strategy.

9. The system of claim 1, wherein the first module is configured to generate asset explainability, capture dependencies, and identify lineage to provide a comprehensive analysis report evaluating feasibility of automated conversion.

10. The system of claim 1, wherein inventory analysis involves cataloging hardware, software, configurations, and dependencies.

11. The system of claim 1, wherein the first module is further configured to offer recommendations for rationalization, conduct duplicate/similarity analysis, and suggest plans for execution in waves.

12. The system of claim 1, wherein the workload transformations are selected from the group comprising:
code/extract transform load (ETL), reports, and/or data.

13. The system of claim 1, wherein the second module leverages real-time contextual information and past performance data to determine the prompt for each specific workload transformation.

14. The system of claim 1, wherein the validation mechanisms are selected from the group comprising:
visual comparison, test script generation and execution, conversion statistics and comparison, migration reports, and similarity comparison reports.

15. The system of claim 1, the third module comprising:
a validation module configured to ensure correctness and functionality of migrated applications and data by providing corrective suggestions or making adjustments; and
a recommendations module configured to monitor and optimize resource allocation, performance, and cost-efficiency.

16. The system of claim 1, the adaptive prompt module further comprising:
a self-learning module configured to enable integration across the third Audtr module, the second module, and the first module.

17. A system for streamlining and accelerating cloud migration comprising:
an adaptive prompt module configured to define a prompt strategy, create a library of effective prompts, and dynamically select one or more prompts from at least one large language model (LLM) based on context and historical learning and communication with the at least one LLM to align with specific requirements of a cloud migration task;
a first module including a suite of services for inventory collection and subsequent assessment, the first module comprising an inventory analysis module configured to initiate the cloud migration by conducting inventory analysis of existing on-premises infrastructure and applications using generative artificial intelligence (AI), wherein the first module is configured to provide generated insights to the adaptive prompt module to enhance the prompt strategy;
a second module configured to perform workload transformations and determine the prompt for each specific workload transformation, the second module including a workload transformation engine that performs the workload transformations based on the library of prompts; and
a third module configured to provide validation mechanisms to ensure accuracy and integrity of original and converted assets guided by LLM procedures, wherein the prompt selection of the adaptive prompt module influences the validation mechanisms used by the third module;
wherein the adaptive prompt module includes a self-learning module configured to enable integration across the third module, the second module, and the first module, wherein the self-learning module dynamically adjusts prompt selections based on real-time context and historical learning to address specific needs of the cloud migration task.

18. The system of claim 17, the third module comprising:
a validation module configured to ensure correctness and functionality of migrated applications and data by providing corrective suggestions or make adjustments;
a recommendations module configured to monitor and optimize resource allocation, performance, and cost-efficiency; and
a migration reports module configured to generate documentation summarizing the migration process.

19. The system of claim 17, wherein the second module leverages real-time contextual information and past performance data to determine the prompt for each specific workload transformation.

* * * * *